United States Patent
Ohmura et al.

(10) Patent No.: US 7,470,892 B2
(45) Date of Patent: Dec. 30, 2008

(54) OPTICAL ENCODER

(75) Inventors: Yoichi Ohmura, Tokyo (JP); Toru Oka, Tokyo (JP); Hajime Nakajima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/598,450

(22) PCT Filed: Aug. 5, 2004

(86) PCT No.: PCT/JP2004/011250

§ 371 (c)(1),
(2), (4) Date: Mar. 13, 2007

(87) PCT Pub. No.: WO2005/085767

PCT Pub. Date: Sep. 15, 2005

(65) Prior Publication Data

US 2007/0187581 A1    Aug. 16, 2007

(30) Foreign Application Priority Data

Mar. 3, 2004    (JP) .............................. 2004-058973

(51) Int. Cl.
*H01J 3/14*    (2006.01)
(52) U.S. Cl. ............................ 250/237 G; 250/231.14; 250/231.15; 356/616
(58) Field of Classification Search ............. 250/237 G, 250/231.13–253.18; 356/356, 373, 400, 356/401, 616, 622
See application file for complete search history.

(56) References Cited

U.S. PATENT DOCUMENTS 5,067,816 A    11/1991  Ichikawa
5,774,219 A    6/1998   Matsuura
6,472,658 B2 * 10/2002  Mayer et al. ............ 250/237 G
6,635,863 B1 * 10/2003  Nihommori et al. ..... 250/231.13
2004/0012793 A1 1/2004 Schubert

FOREIGN PATENT DOCUMENTS

| JP | 4-307329   | 10/1992 |
| JP | 6-42981    | 2/1994  |
| JP | 6-347291   | 12/1994 |
| JP | 6347291    | 12/1994 |
| JP | 10-2761    | 1/1998  |
| JP | 2004-37341 | 2/2004  |

OTHER PUBLICATIONS

Hane, K. et al.; "Imaging with rectangular transmission gratings", *J. Optical Society of America*, vol. 4, No. 4, pp. 706-711, (Apr. 1987).

* cited by examiner

*Primary Examiner*—Georgia Y Epps
*Assistant Examiner*—Tony Ko
(74) *Attorney, Agent, or Firm*—Leydig, Voit & Mayer, Ltd.

(57) ABSTRACT

An optical encoder includes an incoherent light source; a first grating, which is an amplitude grating having a first grating period, for spatial amplitude modulation of the incoherent light from the light source; a second grating, which is a phase grating having a second grating period, for spatial phase modulation of light from the first grating; a third grating, which is an amplitude grating having a third grating period, for spatial amplitude modulation of light from the second grating; and a light detecting element for detecting light from the third grating. The encoder detects relative displacement between the respective gratings. The optical transfer function from the light source to the light detecting element is enhanced, and the efficiency in utilizing light is improved.

22 Claims, 12 Drawing Sheets

OPTICAL ENCODER

TECHNICAL FIELD

The present invention relates to an optical encoder, which can optically detect a relative displacement between gratings.

BACKGROUND

In the non-patent document 1 noted below, proposed is a theory of grating image (triplet grating method) in an optical encoder provided with three gratings. According to this theory, in case of using a spatially incoherent light source, when a first grating, a second grating and a third grating are arranged along a light propagating direction in a particular condition, a predetermined spatial frequency component, which is included in the first grating, can be imaged on the third grating with a predetermined OTF (Optical Transfer Function). The particular condition may be defined by parameters, such as shape of the second grating, a distance from the first grating to the second grating, a distance from the second grating to the third grating, etc. These parameters can define OTF of respective spatial frequency components included in the first grating to the third grating.

In the theory of grating image (triplet grating method), the respective three gratings have such functions as: 1) the first grating; which defines a distribution of spatial frequency on an incident plane, 2) the second grating; OTF of each spatial frequency from the first grating to the third grating is defined by a shape of the second grating for applying transmittance modulation or phase modulation, a distance from the first grating to the second grating, a distance from the second grating to the third grating, etc, 3) the third grating; which transmits only a desired component out of a distribution of imaging intensity, i.e., acts as an index slit.

Meanwhile, in the following patent document 1, disclosed is an optical encoder for applications of the theory of grating image (triplet grating method). This optical encoder is composed of an optical transparent grating as the first grating, which can create a light and dark pattern due to optical interference caused by difference in phase of light passing through the grating element, thereby reducing light cut off by the first grating. Consequently, more light can be transmitted to a light-receiving element.

[PATENT DOCUMENT 1] JP-10-2761(1998), A (FIG. 3)
[NON-PATENT DOCUMENT 1] K. Hane and C. P. Grover, "Imaging with rectangular transmission gratings," J. Opt. Soc. Am. A4 706-711, 1987

The optical encoder according to the patent document 1 employs a grating having opaque portions and transparent portions alternately arranged as the second grating, hence OTF in the theory of grating image (triplet grating method) is decreased. In addition, since the first transparent grating is irradiated with a diffusing light source to create the light and dark pattern due to optical interference caused by difference in phase of light, the contrast of the distribution of intensity, that is, the contrast of a spatial frequency component residing in the distribution of intensity on the incident plane is decreased.

DISCLOSURE OF THE INVENTION

[Problem to be Solved by the Invention]

An object of the present invention is to provide an optical encoder which can enhance OTF from a light source to a light receiving element and greatly improve efficiency of utilizing light.

[Means for Solving the Problem]

An optical encoder according to the present invention includes: a light source; a first grating, which is composed of an amplitude grating having a first grating period, for spatial amplitude modulation of light from the light source; a second grating, which is composed of a phase grating having a second grating period, for spatial phase modulation of light from the first grating; a third grating, which is composed of an amplitude grating having a third grating period, for spatial amplitude modulation of light from the second grating; and a light receiving element for receiving light of the third grating, wherein the encoder detects a relative displacement between the respective gratings.

It is preferable in the present invention that the second grating is composed of a transparent phase grating having an indented shape with a duty ratio of substantially 50%, in which optical path difference between the ridge and the valley thereof is substantially equal to $\lambda/2$ where $\lambda$ is wavelength of light.

Further, it is preferable in the present invention that the second grating is composed of a transparent phase grating having an indented shape with a duty ratio of substantially 50%, in which optical path difference between the ridge and the valley thereof is substantially equal to $\lambda/4$ where $\lambda$ is wavelength of light.

In addition, it is preferable in the present invention that the second grating is composed of a reflective phase grating, and the first and third gratings are arranged on the same side with respect to the second grating.

Further, it is preferable in the present invention that the second reflective grating has an indented shape with a duty ratio of substantially 50%, in which optical path difference between the ridge and the valley thereof is substantially equal to $\lambda/4$, where $\lambda$ is wavelength of light.

Furthermore, it is preferable in the present invention that the second reflective grating has an indented shape with a duty ratio of substantially 50%, in which optical path difference between the ridge and the valley thereof is substantially equal to $\lambda/8$ where $\lambda$ is wavelength of light.

Moreover, it is preferable in the present invention that the first, the second and the third gratings have the same period P, and both a first distance between the first and the second gratings and a second distance between the second and the third gratings are designed substantially to odd integral multiple of $P^2/(4\lambda)$ where $\lambda$ is wavelength of light.

Further, it is preferable in the present invention that the second grating has a period P, and the first and the third gratings have the same period 2P, and both a first distance between the first and the second gratings and a second distance between the second and the third gratings are designed to substantially odd integral multiple of $P^2/(4\lambda)$ where $\lambda$ is wavelength of light.

Furthermore, it is preferable in the present invention that the second grating is composed of a phase grating in which optical path difference varies sinusoidally.

In addition, it is preferable in the present invention that a first distance Z1 between the first and the second gratings is different from a second distance Z2 between the second and the third gratings, and the ratio of the first distance to the second distance is substantially equal to the ratio of a period of the first grating to a period of the third grating.

Further, it is preferable in the present invention that the first, the second and the third gratings have scales of rotary type.

Further, it is preferable in the present invention that the first grating has spatial distribution of transmittance varying sinusoidally.

Furthermore, it is preferable in the present invention that a plurality of light receiving elements are arranged discretely with the third grating period, and the third grating and the light receiving elements are integrated with each other.

[Effect of the Invention]

According to the present invention, employment of the second grating composed of a phase grating can enhance OTF according to the theory of grating image (triplet grating method), thereby greatly improving efficiency of utilizing light.

BRIEF DESCRIPTION OF THE DRAWINGS

FIGS. 5A and 5B illustrate an example in case of using the second grating formed of a phase grating, in which FIG. 5a is a graph showing an example of an output signal from a light receiving element, and FIG. 5B is a graph showing a distortion component of the output signal.

FIGS. 6A and 6B illustrate a comparative example in case of using the second grating formed of an amplitude grating, in which FIG. 6a is a graph showing an example of the output signal from the light receiving element, and FIG. 6B is a graph showing a distortion component of the output signal.

FIGS. 7A and 7B illustrate an example in case of changing optical distances Z1 and Z2 in Embodiment 2 according to the present invention, in which FIG. 7a is a graph showing an example of the output signal from the light receiving element, and FIG. 7B is a graph showing a distortion component of the output signal.

FIGS. 9A and 9B illustrate an example in case of using the first grating shown in FIG. 8, in which FIG. 9a is a graph showing an example of the output signal from the light receiving element 17, and FIG. 9B is a graph showing a distortion component of the output signal.

EXPLANATORY NOTE

11 LIGHT SOURCE
12 FIRST GRATING
13, 15 SUBSTRATE
14 SECOND GRATING
16 THIRD GRATING
17 LIGHT RECEIVING ELEMENT
21, 71 TRANSPARENT AREA
22, 72 OPAQUE AREA

BEST EMBODIMENT FOR CARRYING OUT THE INVENTION

Embodiment 1

Figure 1:
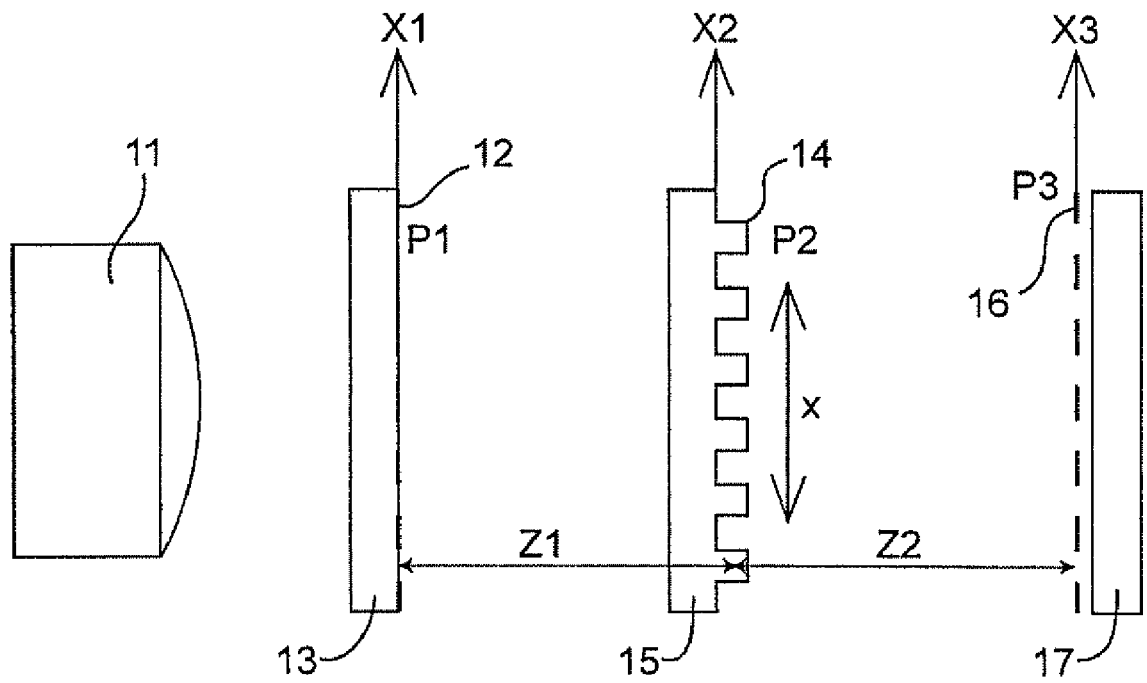
FIG. 1 is a schematic view showing Embodiment 1 according to the present invention.

FIG. 1 is a schematic view showing Embodiment 1 according to the present invention. An optical encoder includes as components, along a light propagating direction, a light source 11, a first grating 12, a second grating 14, a third grating 16 and a light receiving element 17.

The light source 11, which is composed of a spatially incoherent light source, such as LED, emits spatially incoherent light with central wavelength $\lambda$.

The first grating 12, which is formed by patterning a metal thin film on a transparent substrate 13, constitutes an amplitude grating having a grating period P1 so as to spatially amplitude-modulate the light from the light source. It is preferable that, as shown in a plan view of FIG. 2, a transparent area 21 and an opaque area 22 are alternately arranged at an interval of half of the grating period P1, i.e., P1/2, to form an amplitude grating with a duty ratio of 50%.

Figure 3:
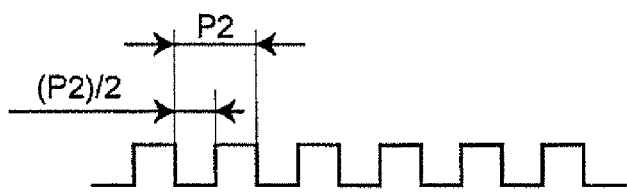
FIG. 3 is a partial cross sectional view showing an example of a grating pattern of a second grating.

The second grating 14, which is formed by periodic binary level on the surface of a transparent substrate 15, constitutes a phase grating having a grating period P2 so as to spatially phase-modulate the light from the first grating 12. It is preferable that, as shown in a cross sectional view of FIG. 3, the ridge and the valley thereof are alternately arranged at an interval of half of the grating period P2, i.e., P2/2, to form a phase grating with a duty ratio of 50%. Further, it is preferable that optical path difference between the ridge and the valley is designed to substantially $\lambda/2$ (difference $\pi$ in phase) where $\lambda$ is wavelength of light. Hence, difference in phase between the light passing through the ridge and the light passing through the valley can be kept $\pi$, thereby maximizing OTF in the theory of grating image (triplet grating method).

The third grating 16 constitutes an amplitude grating having a grating period P3 so as to spatially amplitude-modulate the light from the second grating 14. It is preferable that, like the first grating 12 shown in FIG. 2, a transparent area and an opaque area are alternately arranged at an interval of half of the grating period P3, i.e., P3/2, to form an amplitude grating with a duty ratio of 50%.

The light receiving element 17, such as photo diode, converts the light passing through the third grating 16 into an electric signal. Herein the third grating 16 is located integratedly onto a detecting surface of the light receiving element 17.

The first grating 12 is secured to a housing or the like, and the third grating is secured to the light receiving element or the like, whereas the second grating 14 is supported movably along X-direction across the light propagating direction.

Here Z1 is an optical distance from the first grating 12 to the second grating 14, and Z2 is an optical distance from the second grating 14 to the third grating 16. In an illustrative case where P1, P2 and P3 are equal to each other and Z1=Z2, to satisfy a condition that a spatial frequency component included in the first grating 12 can imaged on the third grating 16, when the second grating 14 is displaced by half interval, i.e., P2/2, of the grating period P2, distribution of light intensity on the third grating 16 moves by one interval. Then, the light passing through the third grating 16 is converted into an electric signal by the light receiving element 17, followed by counting changing of the signal intensity. Consequently, the relative displacement of the second grating 14 can be detected.

Next, described below is a method for design of the condition that a spatial frequency component included in the first grating 12 can imaged on the third grating 16, based on the theory of grating image (triplet grating method). In the example of FIG. 1, frequency property and contrast thereof of an image created on the third grating 16 can be obtained by calculating OTF (Optical Transfer Function). It is known that OTF can be expressed using Fourier transformation of the square of impulse response h as the following equation (1).

Figure 4:
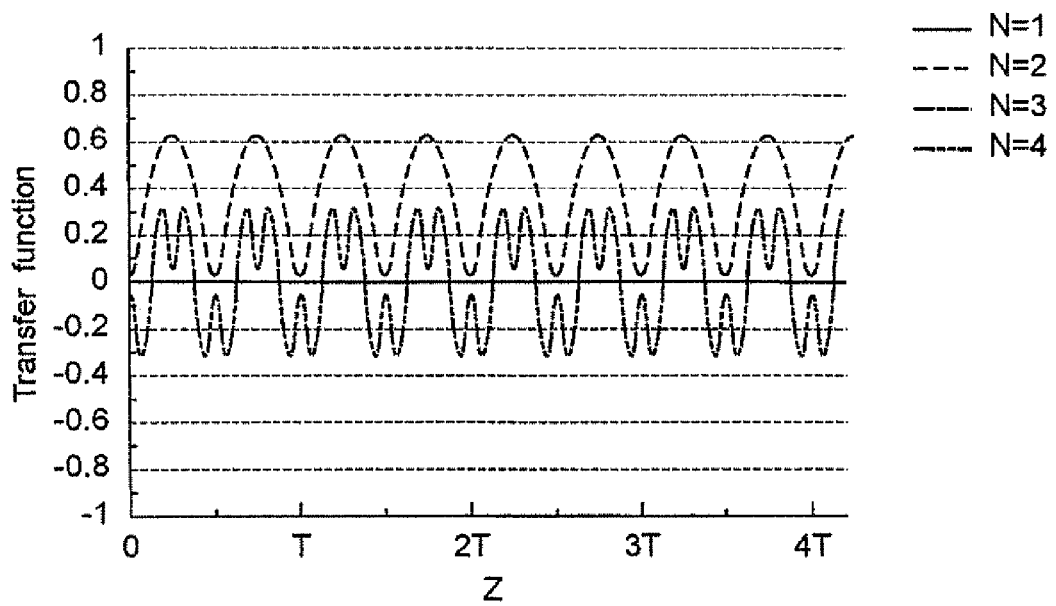
FIG. 4 is a graph showing relation of OTF to a distance between gratings, in case of optical path difference on the second grating being $\lambda/2$, and $Z1=Z2$.

[Equation 1]

$$F(\sigma_3) = \int |h(x_1, x_3)|^2 \exp(-2\pi i \sigma_3 x_3) dx_3 \quad (1)$$

where a σ3 (=1/P3) is a spatial frequency of the image on the third grating 16, and x1 and x2 are X-coordinates of the first grating 12 and the third grating 16 in FIG. 1, respectively.

when calculating this OTF in a case of the second grating 14 having a periodic binary shape with a duty ratio of 50% and a optical path difference of λ/2 (difference π in phase), and Z1=Z2, a result shown in FIG. 4 is obtained.

In FIG. 4, the vertical axis means a relative output normalized by DC component, i.e., OTF, and the horizontal axis means the distance Z (=Z1=Z2) normalized by Talbot position T, i.e., $(P2)^2/\lambda$, which can be defined by wavelength λ and the period P2 of the second grating 14. The letter N in FIG. 4 corresponds to parameter N in the imaging condition defined by the following equation (2).

[Equation 2]

$$\left(1 + \frac{Z2}{Z1}\right) \times \sigma 3 \times P2 = N \quad (2)$$

In only case of this parameter N being an integer, a spatial frequency included in the first grating 12 can be imaged on the third grating 16 with a predetermined OTF. For example, in a case of N=2, when each of distances Z1 and Z2 is an odd integral multiple of T/4 it can be imaged on the third grating 16 with OTF of approximately 0.6. This OTF is comparable to double of the OTF value which has been described in the non-patent document 1 in case of using an amplitude grating as the second grating 14.

Therefore, any combination of parameters, such as P1, P2, P3, Z1, Z2, λ, etc, can be selected for design so as to satisfy an imaging condition corresponding to parameter N in the above-described equation (2) and OTF in FIG. 4.

Figure 5A:
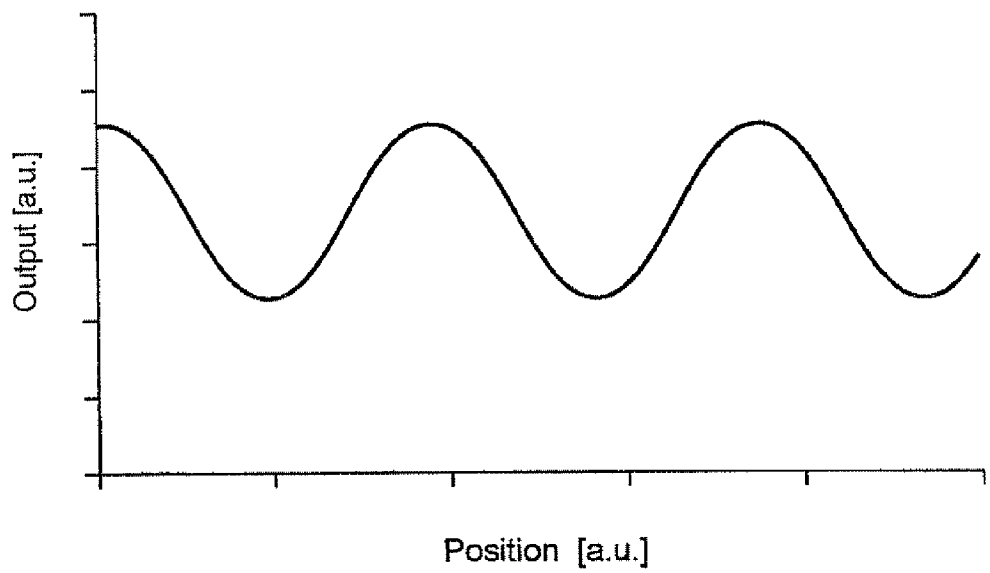
Figure 5B:
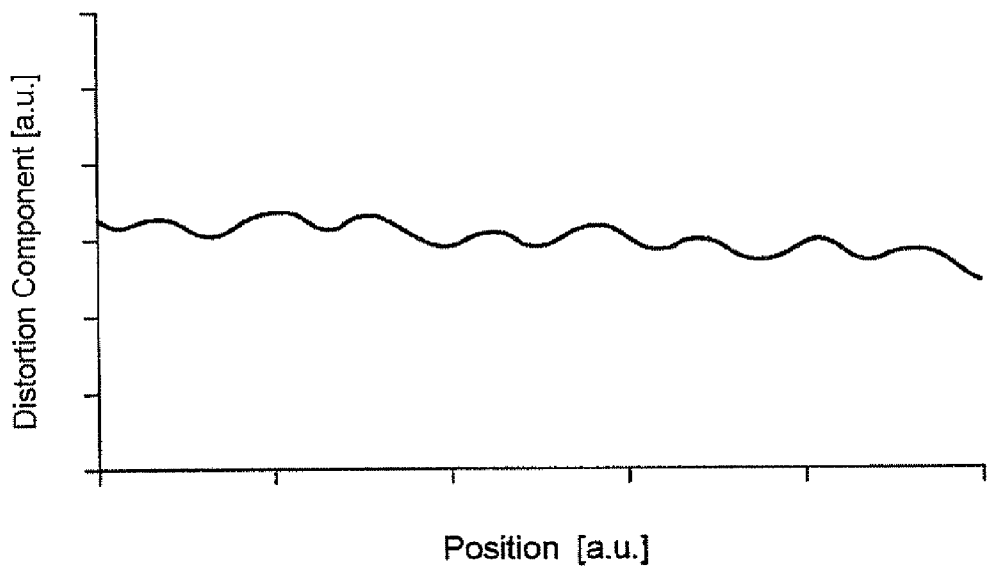

For a specific example, the case of N=2 with P1=P2=P3 and Z1=Z2 will be described below. FIG. 5A shows an output signal of the light receiving element 17, where λ=850 nm; wavelength of the light source 11, P1=64.7 μm; grating period of the first grating 12, P2=64.7 μm; grating period of the second grating 14, P3=64.7 μm; grating period of the third grating 16, and Z1=Z2=1,230 μm, i.e., N=2. The vertical axis means signal intensity (arbitrary unit), and the horizontal axis means position of the second grating 14 (arbitrary unit). Z1=Z2=1,230 μm are distances of T/4, corresponding to the position with the maximum OTF in the condition of N=2 in FIG. 4. Incidentally, FIG. 5B is a graph showing a distortion component of the output signal, which may be an error factor for phase detection.

Figure 6A:
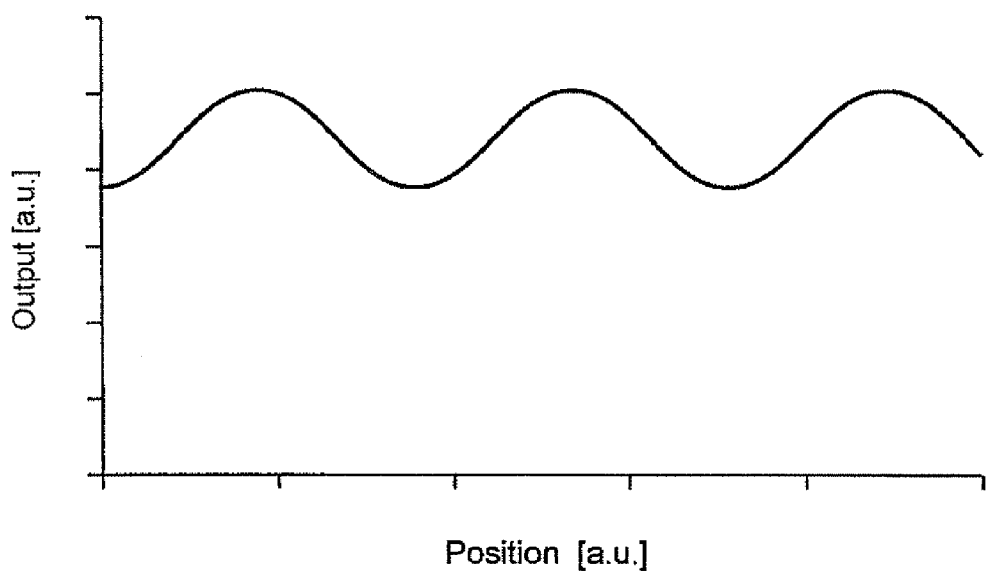
Figure 6B:
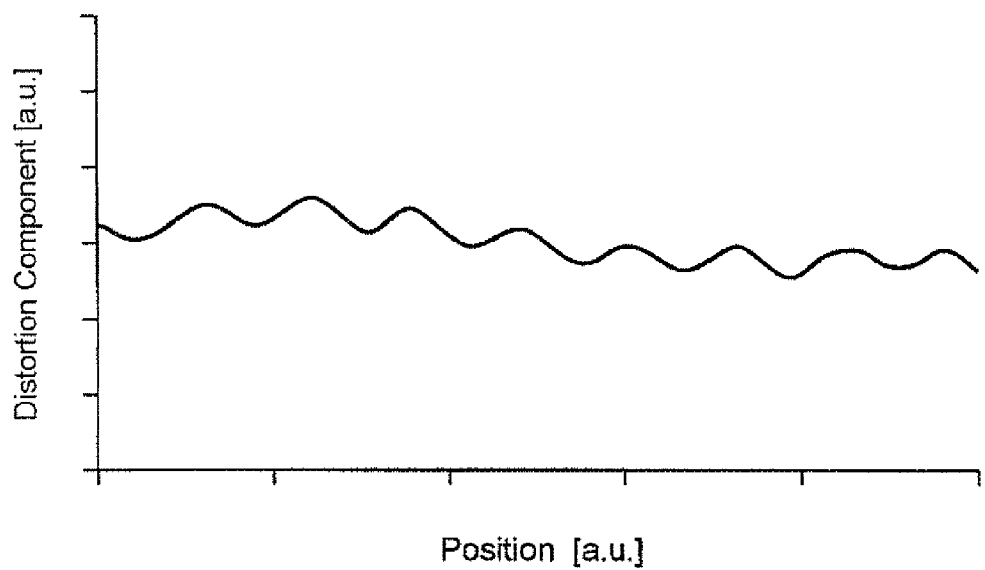

For a comparative example, FIG. 6A shows an output signal of the light receiving element 17, in the same condition of the first and third gratings 12 and 16 and the optical distances Z1 and Z2 and wavelength λ except for usage of an amplitude grating for the second grating 14. The vertical axis means signal intensity (arbitrary unit), and the horizontal axis means position of the second grating 14 (arbitrary unit). This amplitude grating has a transparent area and an opaque area being arranged alternately at an interval of P2/2, with a grating period of P2 (=64.7 μm) and a duty ratio of 50%. FIG. 6B is a graph showing a distortion component of the output signal.

Comparing FIG. 5A to FIG. 6A, an output signal with a period of 32.35 μm, that is half of the period P2 of the second grating 14, can be seen in each graph. But contrast of the signal exhibits 17% in FIG. 6A, whereas 38% with a good waveform in FIG. 5A. Incidentally, the contrast of intensity distribution on the third grating 16, which can be calculated based on the resultant output of the light receiving element, exhibits approximately 60% in FIG. 5A because of the duty ratio of the third grating 16 being 50%. This coincides generally with the calculation result of OTF shown in FIG. 4.

Thus, employment of the second grating composed of a phase grating can improve OTF twice as much as an amplitude grating, and enhance contrast of the output signal from the light receiving element. In addition, such a phase grating can increase amount of light passing therethrough twice as much as the amplitude grating having a transparent area and an opaque area being repeated with a duty ratio of 50%, thereby improving efficiency of utilizing light emitted from the light source.

In the above-described example, the optical distances Z1 and Z2 are designed to T/4=1,230 μm. In the case of the three grating periods P1, P2 and P3 being equal to each other, it can be seen from the result of FIG. 4 that OTF is maximized when each of the optical distances Z1 and Z2 is designed to odd integral multiple of T/4. Hence, in the above-described example, similar result can be attained when each of the optical distances Z1 and Z2 is designed to odd integral multiple of T/4. Moreover, even in the other case of Z1 and Z2 being not odd integral multiple of T/4, efficiency of utilizing light can be improved and contrast can be enhanced as shown in FIG. 4.

Embodiment 2

In this embodiment, an optical encoder includes, along a light propagating direction, a light source 11, a first grating 12, a second grating 14, a third grating 16 and a light receiving element 17. This embodiment is configured similarly to Embodiment 1, but optical distances Z1 and Z2 are different from those of Embodiment 1.

Specifically, in Embodiment 1, the optical distances Z1 and Z2 are designed to 1,230 μm or odd integral multiple thereof, respectively, in condition of N=2. In this embodiment, the optical distances Z1 and Z2 are designed to 1,050 μm, respectively, in condition of N=2.

Figure 7A:
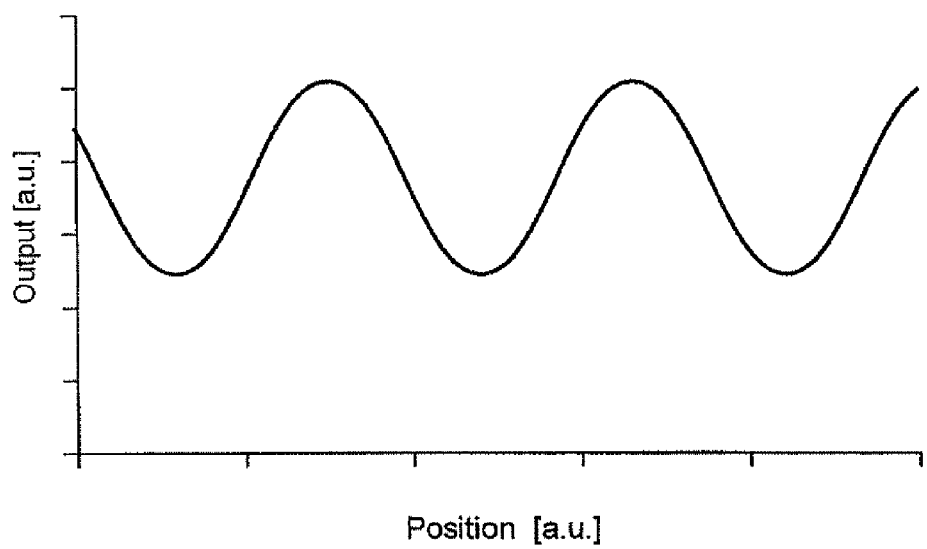
Figure 7B:
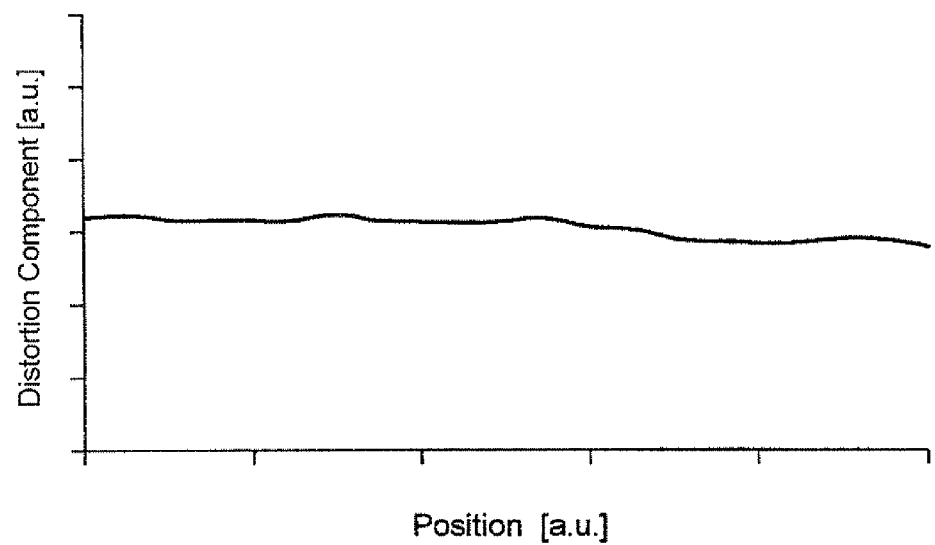

FIG. 7a is a graph showing an output signal from the light receiving element in this embodiment, and FIG. 7B is a graph showing a distortion component of the output signal. Each horizontal axis means position of the second grating 14 (arbitrary unit). The vertical axis of FIG. 7A means signal intensity (arbitrary unit). The vertical axis of FIG. 7B means distortion component, indicating an error between the output signal and an ideal sinusoidal waveform, that is further normalized by a peak-to-peak value.

It can be seen that FIG. 7B exhibits slight variations of offset due to changing of observed distribution of light intensity, but a third order harmonic component is further reduced in comparison with the distortion component in the cases of using the phase grating and the amplitude grating shown in FIGS. 5B and 6B.

Moreover, contrast of the signal exhibits 36% with a good waveform in FIG. 7A, which is approximately equal to that of FIG. 5A.

Here the reason why the third order harmonic component is reduced will be described below. In the above-described example, the first grating 12 is composed of an amplitude grating with rectangular distribution of transmittance, having a grating period P1 and a duty ration of 50%. When the distribution of transmittance is resolved in spatial frequency using Fourier series, it can be expressed as the sum of a fundamental frequency component and odd order harmonic components, that is, a fundamental frequency component of the grating period P1, a third order harmonic component of threefold frequency, a fifth order harmonic component of five fold frequency, and so on.

The theory of grating image (triplet grating method) defines OTF at every spatial frequency. Hence harmonic components included in the first grating can be imaged on the third grating, depending on an imaging condition.

Comparing Embodiment 2 with Embodiment 1, there is a difference in that changing of optical distances between gratings alters OTF of harmonic components. In particular, Embodiment 1 is adjusted so as to maximize OTF of the fundamental frequency component while leaving OTF of harmonic components non-zero. Meanwhile, Embodiment 2 is designed so that OTF of harmonic components may approach zero as small as possible in order to suppress the distortion component of the signal, while OTF of the fundamental frequency component is slightly lowered.

Figure 2:
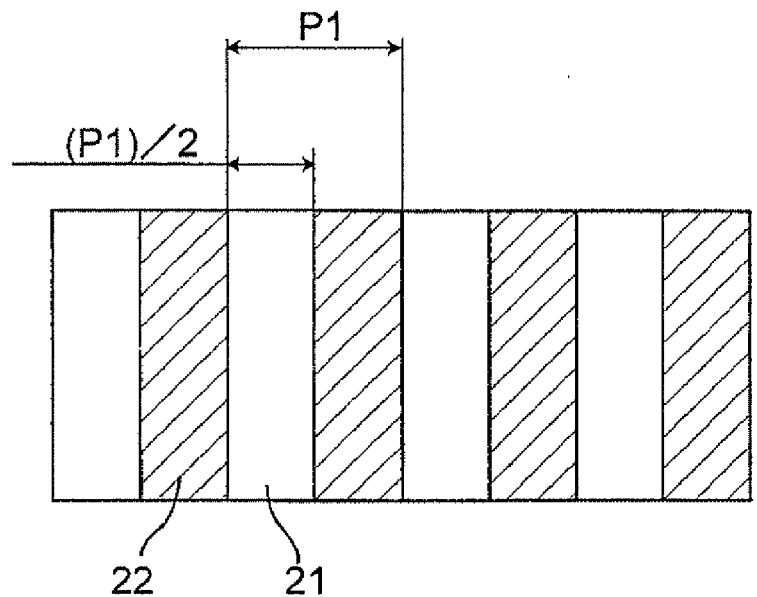
FIG. 2 is a plan view showing an example of a grating pattern of a first grating.

As described above, appropriate adjustment of the optical distances Z1 and Z2 using the theory of grating image (triplet grating method) can greatly reduce the distortion component residing in the output waveform, even when employing the first grating 12 of such an amplitude grating with rectangular distribution of transmittance as shown in FIG. 2.

In the above-described example, the optical distances Z1 and Z2 are designed to 1,050 μm. Any other condition can suppress unnecessary frequency components with the same result.

Embodiment 3

In this embodiment, an optical encoder includes, along a light propagating direction, a light source 11, a first grating 12, a second grating 14, a third grating 16 and a light receiving element 17. This embodiment is configured similarly to Embodiment 1, but distribution of transmittance of the first grating 12 is different from that of Embodiment 1.

Specifically, Embodiments 1 and 2 employ the first grating 12 composed of an amplitude grating with rectangular distribution of transmittance, having a grating period P1 and a duty ration of 50%. This embodiment employs the first grating 12 composed of an amplitude grating with sinusoidal distribution of transmittance, having a grating period P1.

Figure 8:
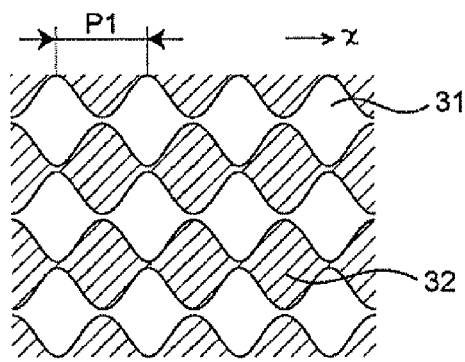
FIG. 8 is a partial plan view showing another example of a grating pattern of a first grating in Embodiment 3 according to the present invention.

FIG. 8 is a partial plan view showing another example of the first grating 12. The first grating 12 is composed so that a plurality of gratings each having a sinusoidal spatial shape with the grating period P1, that is, a fundamental spatial frequency, are arranged in line. An opaque area 32 of the grating is defined between two sinusoids each having a reversed phase, and the opening width of a transparent area 31 varies sinusoidally along X-direction. When a beam of light having a predetermined sectional area enters the first grating 12, it is spatially amplitude-modulated sinusoidally to generate light having sinusoidal distribution of intensity.

The second grating 14, like as the above-described embodiment, is composed of a phase grating with a duty ratio of 50%, in which the ridge and the valley thereof are alternately arranged at an interval of half of the grating period P2, i.e., P2/2, so as to spatially phase-modulate the light from the first grating 12.

The third grating 16, like as the above-described embodiment, is composed of an amplitude grating with a duty ratio of 50%, in which the transparent area and the opaque area thereof are alternately arranged at an interval of half of the grating period P3, i.e., P3/2, so as to spatially amplitude-modulate the light from the second grating 14.

Figure 9A:
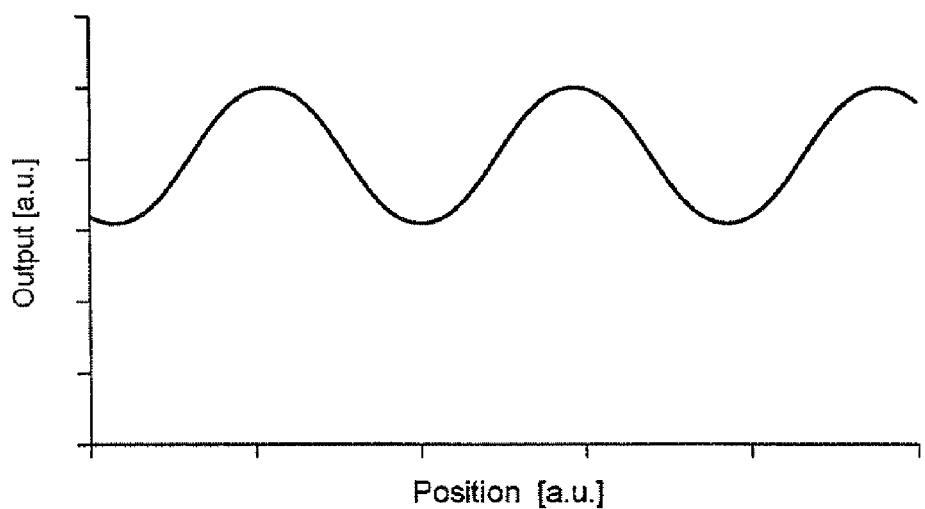
Figure 9B:
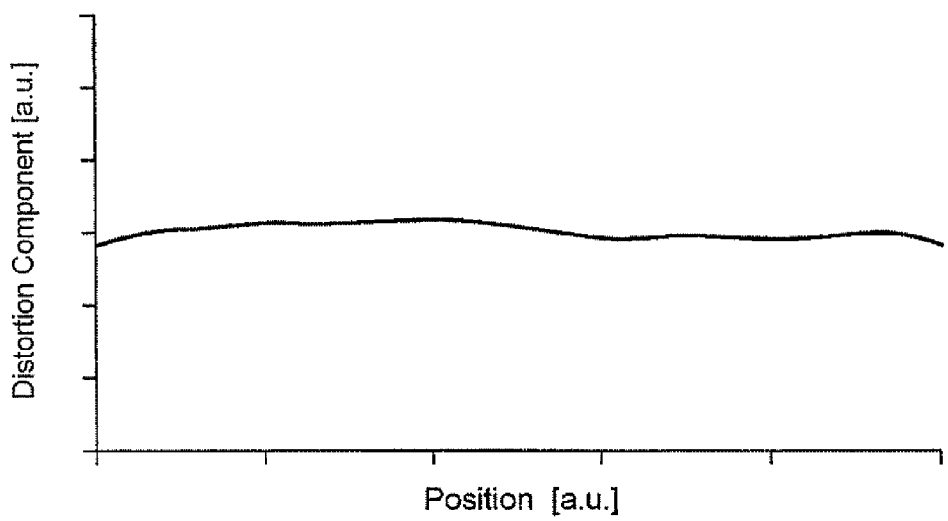

For a specific example, FIG. 9A shows an output signal of the light receiving element 17, where $\lambda$=850 nm, P1=64.7 μm; grating period of the first grating 12, P2=64.7 μm; grating period of the second grating 14, P3=64.7 μm; grating period of the third grating 16, and Z1=Z2=1,230 μm (corresponding to positions with OTF being maximized in N=2). The vertical axis means signal intensity (arbitrary unit), and the horizontal axis means position of the second grating 14 (arbitrary unit). Incidentally, FIG. 9B is a graph showing a distortion component of the output signal.

Referring to these graphs, contrast of the signal exhibits 27%, which is slightly lowered as compared to the case of using the first grating 12 having a rectangular opening, but no distortion component, such as third order harmonic component, takes place.

Here the reason why no distortion component takes place when the transmittance of the first grating 12 varies sinusoidally at a fundamental frequency will be described below. According to the theory of grating image (triplet grating method), contrast of a spatial frequency component on the third grating can be defined by each spatial frequency component on the first grating and OTF resulting from the second grating, the optical distances Z1 and Z2 and so on. In other words, when providing a grating which has no higher order components, i.e., whose transmittance varies sinusoidally at a fundamental spatial frequency, as the first grating which may define distribution of spatial frequency on the incident plane, only the fundamental spatial frequency is always imaged on the third grating no matter how OTF of each harmonic component varies due to error of the optical distances Z1 and Z2.

Accordingly, by employing the first grating composed of an amplitude grating having sinusoidal distribution of transmittance, no higher harmonic component takes place in principle. Even when the distance between gratings, such as Z1 or Z2, varies, contrast of the signal slightly varies while the output signal including no higher harmonic component, i.e., distortion component, but the fundamental spatial frequency can be obtained.

Incidentally, this embodiment exemplifies three sinusoidal gratings arranged as the first grating 12, as shown in FIG. 8. The number of gratings, constituting the transparent areas 31, may be one, two, four or more.

Embodiment 4

In this embodiment, an optical encoder includes, along a light propagating direction, a light source 11, a first grating 12, a second grating 14, a third grating 16 and a light receiving element 17. This embodiment is configured similarly to Embodiment 1, but height of the binary shape of the second grating 14 is different from that of Embodiment 1.

Specifically, in Embodiment 1, optical path difference between the ridge and the valley of the second grating 14 is designed to $\lambda/2$ (difference n in phase). In this embodiment, the difference in optical path between the ridge and the valley of the second grating 14 is designed to $\lambda/4$ (difference $\pi/2$ in phase). Similarly, the ridge and the valley are alternately arranged at an interval of half of the grating period P2, i.e., P2/2, to form a phase grating with a duty ratio of 50%.

Figure 10:
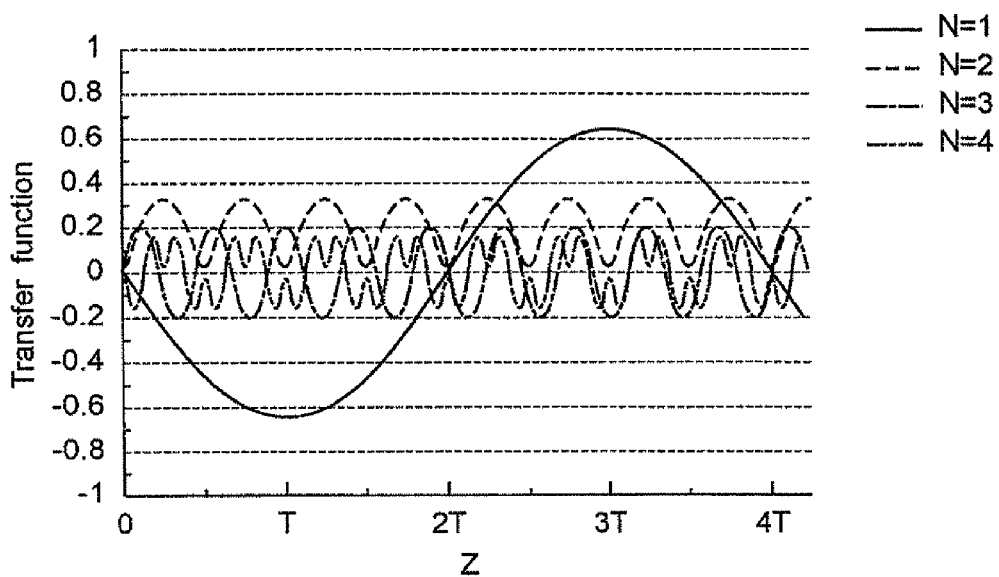
FIG. 10 is a graph showing a calculation result of OTF in case of optical path difference on the second grating being $\lambda/4$, and $Z1=Z2$.

FIG. 10 is a graph showing a calculation result of OTF in case of optical path difference on the second grating 14 being $\lambda/4$, and Z1=Z2. In FIG. 10, the vertical axis means a relative output normalized by DC component, i.e., OTF, and the horizontal axis means the distance Z (=Z1=Z2) normalized by Talbot position T, i.e., $(P2)^2/\lambda$, which can be defined by wavelength $\lambda$ and the period P2 of the second grating 14. In order that a spatial frequency included in the first grating 12 can imaged with a predetermined OTF on the third grating 16, any combination which satisfies both of the calculation result of OTF in FIG. 10 and the above-described imaging condition with respect to N can be selected, thereby allowing any combination of period of each grating, distance Z, etc.

For a specific example in a case of N=1, when P3 is double P2 and each of the distances Z1 and Z2 is odd integral multiple of T according the equation of imaging condition, an image with OTF of approximately 0.6 can be created on the third grating. In this case, P1 is equal to P3. The resultant OTF of approximately 0.6 is equivalent to the maximum OTF shown in FIG. 4.

Embodiment 5

In this embodiment, an optical encoder includes, along a light propagating direction, a light source 11, a first grating 12, a second grating 14, a third grating 16 and a light receiving element 17. This embodiment is configured similarly to Embodiment 1, but height of the binary shape of the second grating 14 is different from that of Embodiments 1 and 4.

Specifically, in Embodiment 1, optical path difference between the ridge and the valley of the second grating 14 is designed to $\lambda/2$ (difference n in phase). In Embodiment 4, optical path difference between the ridge and the valley of the second grating 14 is designed to $\lambda/4$ (difference $\pi/2$ in phase). In this embodiment, the difference in optical path between the ridge and the valley of the second grating 14 is designed to another value other than $\lambda/2$ (difference $\pi$ in phase) and $\lambda/4$ (difference $\pi/2$ in phase). Similarly, the ridge and the valley are alternately arranged at an interval of half of the grating period P2, i.e., P2/2, to form a phase grating with a duty ratio of 50%.

Figure 11:
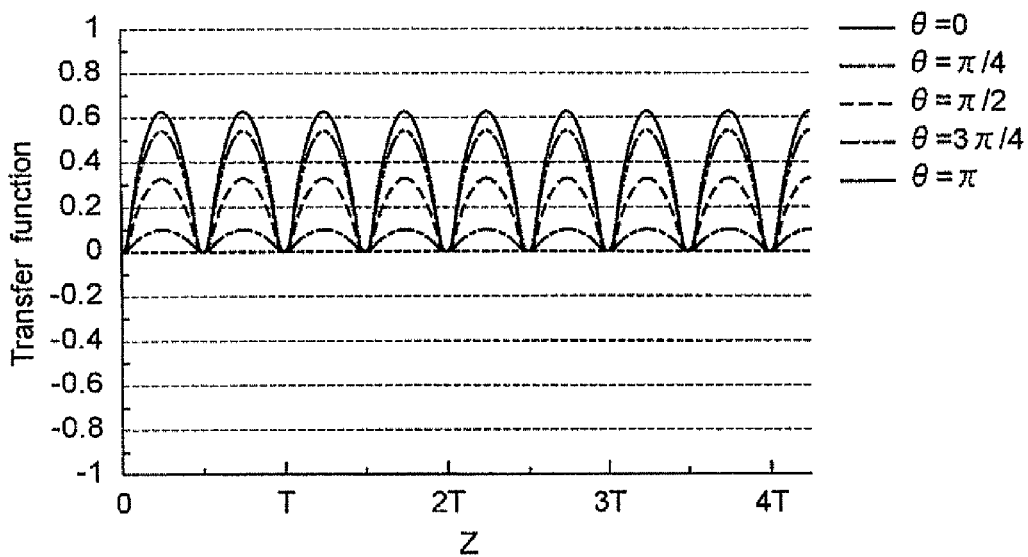
FIG. 11 is a graph showing a calculation result of OTF in case of changing the optical path difference (difference $\theta$ in phase) on the second grating in condition of $N=2$.

FIG. 11 is a graph showing a calculation result of OTF in case of changing the optical path difference (difference $\theta$ in phase) on the second grating 14 in condition of N=2. In FIG. 11, the vertical axis means a relative output normalized by DC component, i.e.r OTF, and the horizontal axis means the distance Z (=Z1=Z2) normalized by Talbot position T, i.e., $(P2)^2/\lambda$, which can be defined by wavelength $\lambda$ and the period P2 of the second grating 14.

In a case of the optical path difference being $3\lambda/8$ ($\theta=3\pi/4$), as shown in FIG. 11, OTF is slightly degraded as compared to the case of the optical path difference being $\lambda/2$ ($\theta=\pi$), but it exceeds the OTF (approximately 0.3) in the case of using the amplitude grating with N=2. According to the imaging condition of N and the calculation result of OTF, a combination of the period, the distance and the optical path difference on the second grating 14 can enhance amount of light twice as much as the amplitude grating, with contrast being improved.

Embodiment 6

In this embodiment, an optical encoder includes, along a light propagating direction, a light source 11, a first grating 12, a second grating 14, a third grating 16 and a light receiving element 17. This embodiment is configured similarly to Embodiment 1, but a phase grating having a periodic binary shape with a duty ratio (ratio of valley to grating period P2 ) of a value, such 40% or 30%, other than 50% is employed as the second grating 14. In addition, the optical path difference between the ridge and the valley of the second grating 14 is also designed to a value other than $\lambda/2$ (difference n in phase) and $\lambda/4$ (difference $\pi/2$ in phase).

In this case, according to the imaging condition of N and OTF, a combination of the period, the distance, the duty ratio and the optical path difference on the second grating can enhance amount of light twice as much as the amplitude grating, with contrast being improved.

Embodiment 7

Figure 12:
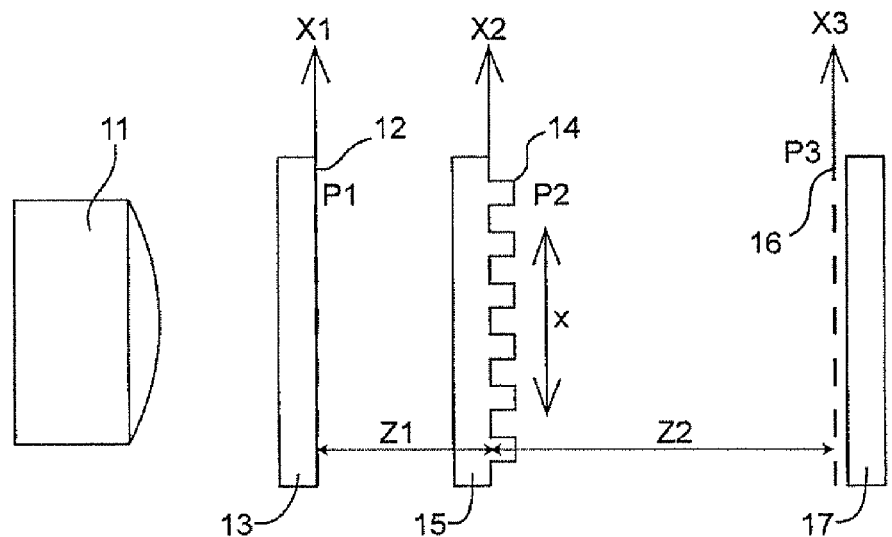
FIG. 12 is a schematic view showing Embodiment 7 according to the present invention.

FIG. 12 is a schematic view showing Embodiment 7 according to the present invention. In this embodiment, an optical encoder includes, along a light propagating direction, a light source 11, a first grating 12, a second grating 14, a third grating 16 and a light receiving element 17. This embodiment is configured similarly to Embodiment 1, but both of the distance Z1 from the first grating 12 to the second grating 14 and the distance Z2 from the second grating 14 to the third grating 16 are different from those of Embodiment 1.

Figure 13:
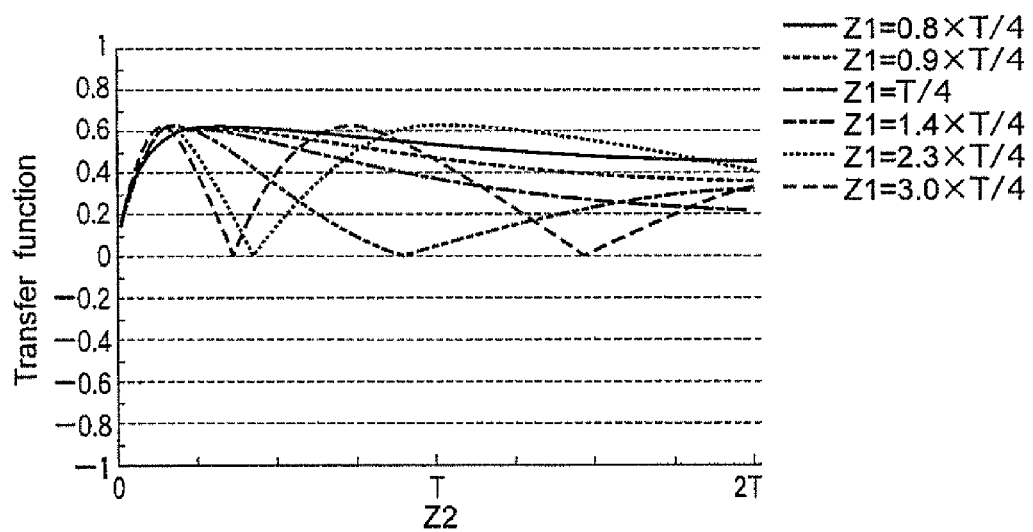
FIG. 13 is a graph showing a calculation result of OTF in condition of $N=2$ and optical path difference being $\lambda/2$, in case of fixing the distance Z1 and changing the distance Z2 in a range of 0 to 2T.

FIG. 13 is a graph showing a calculation result of OTF in condition of N=2 and optical path difference being $\lambda/2$, in case of fixing the distance Z1 at $0.8\times T/4$, $0.9\times T/4$, $T/4$, $1.4\times T/4$, $2.3\times T/4$, or $3.0\times T/4$, and changing the distance Z2 in a range of 0 to 2T, where T is Talbot position, i.e., $(P2)^2/\lambda$, which can be defined by wavelength $\lambda$ and the period P2 of the second grating 14.

In the theory of grating image (triplet grating method), the image of the first grating may be scaled up or down based on the ratio of Z1 to Z2, while satisfying the following equation (3).

[Equation 3]

$$Z_2 \sigma_3 = Z_1 \sigma_1 \qquad (3)$$

Figure 14:
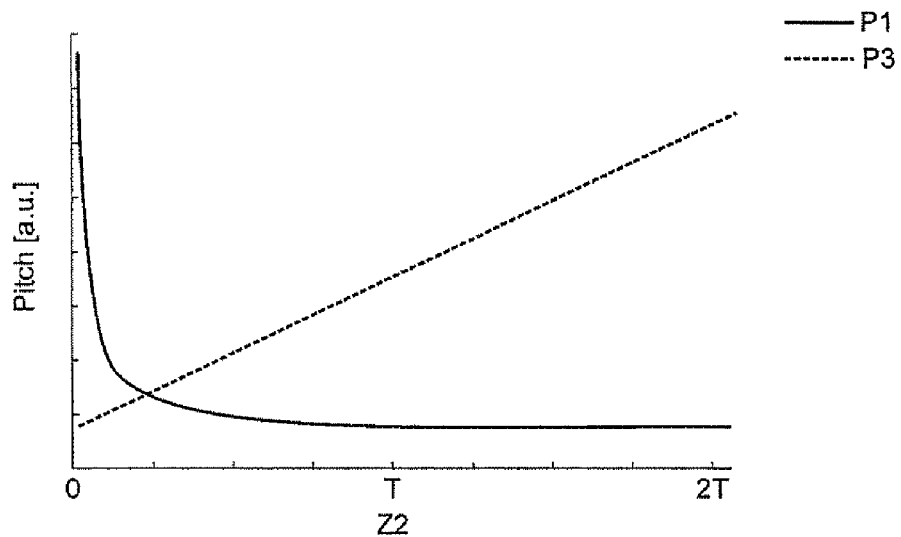
FIG. 14 is a graph showing relation between the distances Z1 and Z2 and periods P1 and P3 in imaging condition.

For example, in a case of Z1=$0.9\times T/4$, as shown in FIG. 14, spatial frequencies $\sigma 3$ (=1/P3) and $\sigma 1$ (=1/P1) may vary depending on the ratio of Z1 to Z2, that is, the period P1 of the first grating 12 and the period p3 of the third grating 16 may vary depending on the ratio of Z1 to Z2.

In a specific case of $\lambda$=850 nm, P2=64.7 μm, and Z1=1.1 mm, OTF is approximately 0.6 at Z2=2.2 mm by reading FIG. 13, where P3=97.2 μm and P1=48.6 μm in FIG. 14. Therefore, the image of the first grating 12 having 48.6 μm is scaled up twofold on the third grating 13.

According to this configuration, the image on the third grating can be enlarged, thereby enhancing contrast and amount of light thereof, and advantageously facilitating alignment of the third grating.

The above-described case exemplifies the optical path difference of $\lambda/2$, but any combination can constitutes a scale-up or scale-down system whenever satisfying the imaging condition of OTF and N, and each condition of spatial frequency defined by the ratio of Z1 to Z2. In addition, even in another case of the optical path difference of, e.g., $\lambda/4$, other than $\lambda/2$, any combination can constitutes a scale-up or scale-down system whenever satisfying the imaging condition of OTF and N, and each condition of spatial frequency defined by the ratio of Z1 to Z2.

Embodiment 8

Figure 15:
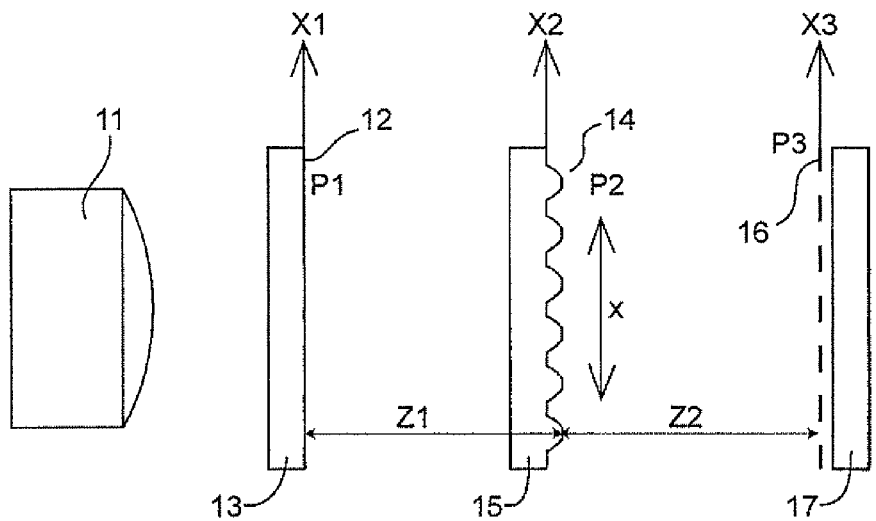
FIG. 15 is a schematic view showing Embodiment 8 according to the present invention.

FIG. 15 is a schematic view showing Embodiment 8 according to the present invention. In this embodiment, an optical encoder includes, along a light propagating direction, a light source 11, a first grating 12, a second grating 14, a third grating 16 and a light receiving element 17. This embodiment is configured similarly to Embodiment 1, but a phase grating in which the optical path difference varies sinusoidally is employed as the second grating 14.

In this case, like above, the image of the first grating 12 can be created on the third grating 16 by combining design parameters, such as the period, the distance Z, based on the calculation result of OTF and the imaging condition.

For example, in a case of N=1 and the optical path difference between the top of the ridge and the bottom of the valley of the second grating 14 being $\lambda/4$ (difference $\sigma/2$ in phase), OTF is approximately 0.6 at a position of Z1=Z2=T, thereby further improving contrast in comparison with an amplitude grating, and doubling amount of light.

FIG. 15 shows as an example the second grating 14 composed of the phase grating having the optical path difference varies sinusoidally. But the second grating 14 may be composed of another phase grating having a periodic distribution of phase, such as triangular or stepwise waveforms, thereby doubling amount of light in comparison with an amplitude grating, and improving contrast.

Embodiment 9

Figure 16:
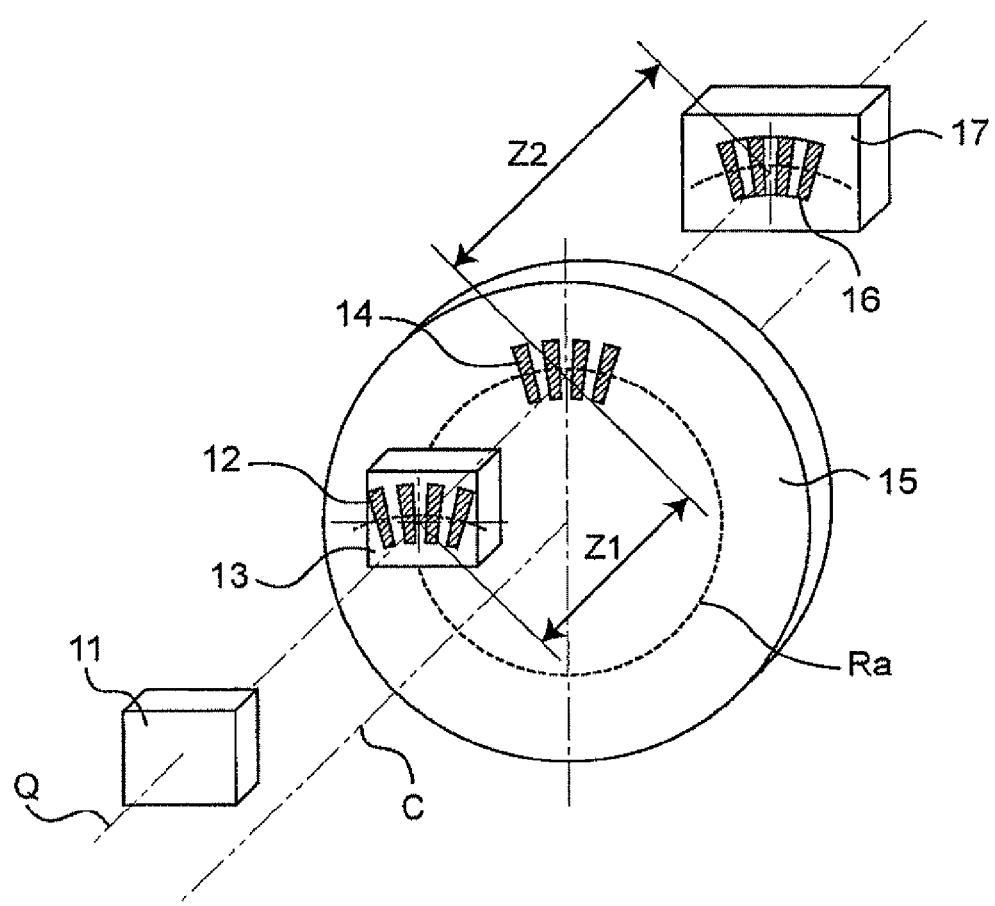
FIG. 16 is a schematic view showing Embodiment 9 according to the present invention.

FIG. 16 is a schematic view showing Embodiment 9 according to the present invention. For easy understanding, each above-described embodiment exemplifies a linear encoder including linear-shaped gratings. The present invention can be applied to a rotary encoder including gratings which are arranged radially with a predetermined angular period.

In this embodiment, an optical encoder includes, along a light propagating direction, a light source 11, a first grating 12, a second grating 14, a third grating 16 and a light receiving element 17. The second grating 14 is supported angularly displaceable around a central axis C.

The light source 11, which is composed of a spatially incoherent light source, such as LED, emits spatially incoherent light with central wavelength $\lambda$. An optical axis Q of the light source 11 is located parallel to the central axis C and at a position of radius Ra from the central axis C.

The first grating 12, which is formed by patterning a metal thin film on a transparent substrate 13, constitutes a rotary scale of an amplitude grating type having a grating period P1 at the position across the optical axis Q so as to spatially amplitude-modulate the light from the light source. It is preferable that, like as shown in FIG. 2, a transparent area 21 and an opaque area 22 are alternately arranged at an interval of half of the grating period P1, i.e., P1/2, to form a sector-shaped amplitude grating with a duty ratio of 50%.

The second grating 14 is formed by periodic binary level on the surface of a transparent disk-shaped substrate 15, which is rotatable around the central axis C. The second grating 14 constitutes a rotary scale of a phase grating type having a grating period P2 at the position across the optical axis Q so as to spatially phase-modulate the light from the first grating 12. It is preferable that, as shown in a cross sectional view of FIG. 3, the ridge and the valley thereof are alternately arranged at an interval of half of the grating period P2, i.e., P2/2, to form a sector-shaped phase grating with a duty ratio of 50%. Further, it is preferable that the optical path difference between the ridge and the valley is designed to substantially $\lambda/2$ where $\lambda$ is wavelength of light. Hence, difference in phase between the light passing through the ridge and the light passing through the valley can be kept $\pi$, thereby maximizing OTF in the theory of grating image (triplet grating method).

The third grating 16 constitutes a rotary scale of an amplitude grating type having a grating period P3 at the position across the optical axis Q so as to spatially amplitude-modulate the light from the second grating 14. It is preferable that, like the first grating 12 shown in FIG. 2, a transparent area and an opaque area are alternately arranged at an interval of half of the grating period P3, i.e., P3/2, to form a sector-shaped amplitude grating with a duty ratio of 50%.

The light receiving element 17, such as photo diode, converts the light passing through the third grating 16 into an electric signal. Herein the third grating 16 is located integratedly onto a detecting surface of the light receiving element 17.

The first grating 12 is secured to a housing or the like, and the third grating 16 is secured to the light receiving element or the like, whereas the second grating 14 is supported to be angularly displaceable along a circumferential direction perpendicular to the optical axis Q.

Here Z1 is an optical distance from the first grating 12 to the second grating 14, and Z2 is an optical distance from the second grating 14 to the third grating 16. OTF in the rotary encoder can be calculated by substituting the grating period in the above-described linear displacement with the grating period at the position across the optical axis Q, to which the above-described theory of grating image (triplet grating method) can apply.

In an illustrative case where Z=Z2 and N=2 to satisfy a condition that a spatial frequency component included in the first grating 12 can imaged on the third grating 16, when the second grating 14 is displaced by half interval, i.e., P2/2, of the grating period P2, distribution of light intensity on the third grating 16 moves by one interval. Then, the light passing through the third grating 16 is converted into an electric signal by the light receiving element 17, followed by counting changing of the signal intensity. Consequently, the relative displacement of the second grating 14 can be detected.

The above-described case exemplifies the optical path difference of $\lambda/2$, but any combination can constitutes a rotary encoder whenever satisfying the imaging condition of OTF and N. In addition, even in another case of the optical path difference of, e.g., $\lambda/4$, other than $\lambda/2$, any combination can constitutes a rotary encoder whenever satisfying the imaging condition of OTF and N.

Embodiment 10

Figure 17:
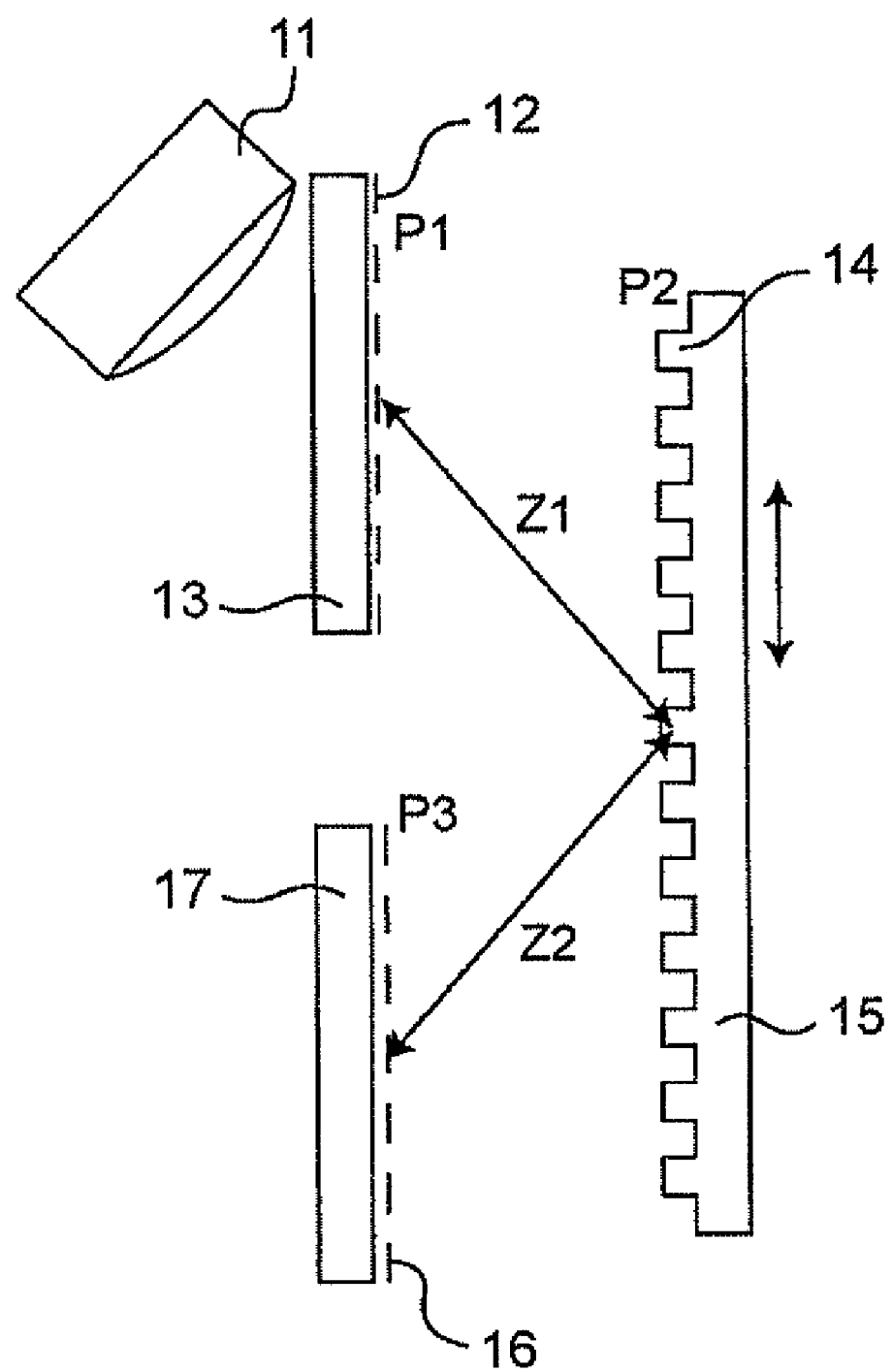
FIG. 17 is a schematic view showing Embodiment 10 according to the present invention.

FIG. 17 is a schematic view showing Embodiment 10 according to the present invention. For easy understanding, each above-described embodiment exemplifies a transparent phase grating for the second grating 14. The present invention can be applied to a case of using a reflective phase grating for the second grating 14.

In this embodiment, an optical encoder includes, along a light propagating direction, a light source 11, a first grating 12, a second grating 14, a third grating 16 and a light receiving element 17, wherein the slit direction of each of the gratings 12, 14 and 16 is designed perpendicular to the sheet of the drawing, and the moving direction of the second grating 14 is designed as a top-to-bottom direction, parallel to the sheet of the drawing. The light from the light source 11 passes obliquely through the first grating 12, and then reflects obliquely on the second grating 14, and then passes obliquely through the third grating 16, and then reaches the light receiving element 17. Each of Z1 and Z2 is defined as a distance along the light propagating direction.

The above-described theory of grating image (triplet grating method) also can apply to this case by substituting the step of the second grating 14 with half of that of the transparent phase grating. In a case of, for example, the optical path difference between the ridge and the valley of the transparent second grating 14 being $\lambda/2$ (difference $\pi$ in phase), the optical path difference between the ridge and the valley of the reflective second grating 14 is $\lambda/4$ (difference $\pi/2$ in phase). In another case of the optical path difference between the ridge and the valley of the transparent second grating 14 being $\lambda/4$ (difference $\pi/2$ in phase), the optical path difference between the ridge and the valley of the reflective second grating 14 is $\lambda/8$ (difference $\pi/4$ in phase).

Thus, by employment of such a reflective phase grating as the second grating 14, a set of the light source 11 and the first grating 12 and another set of the third grating 16 and the light receiving element 17 can be arranged on the same side with respect to the second grating 14, thereby attaining a compact configuration as a whole.

Embodiment 11

Figure 18:
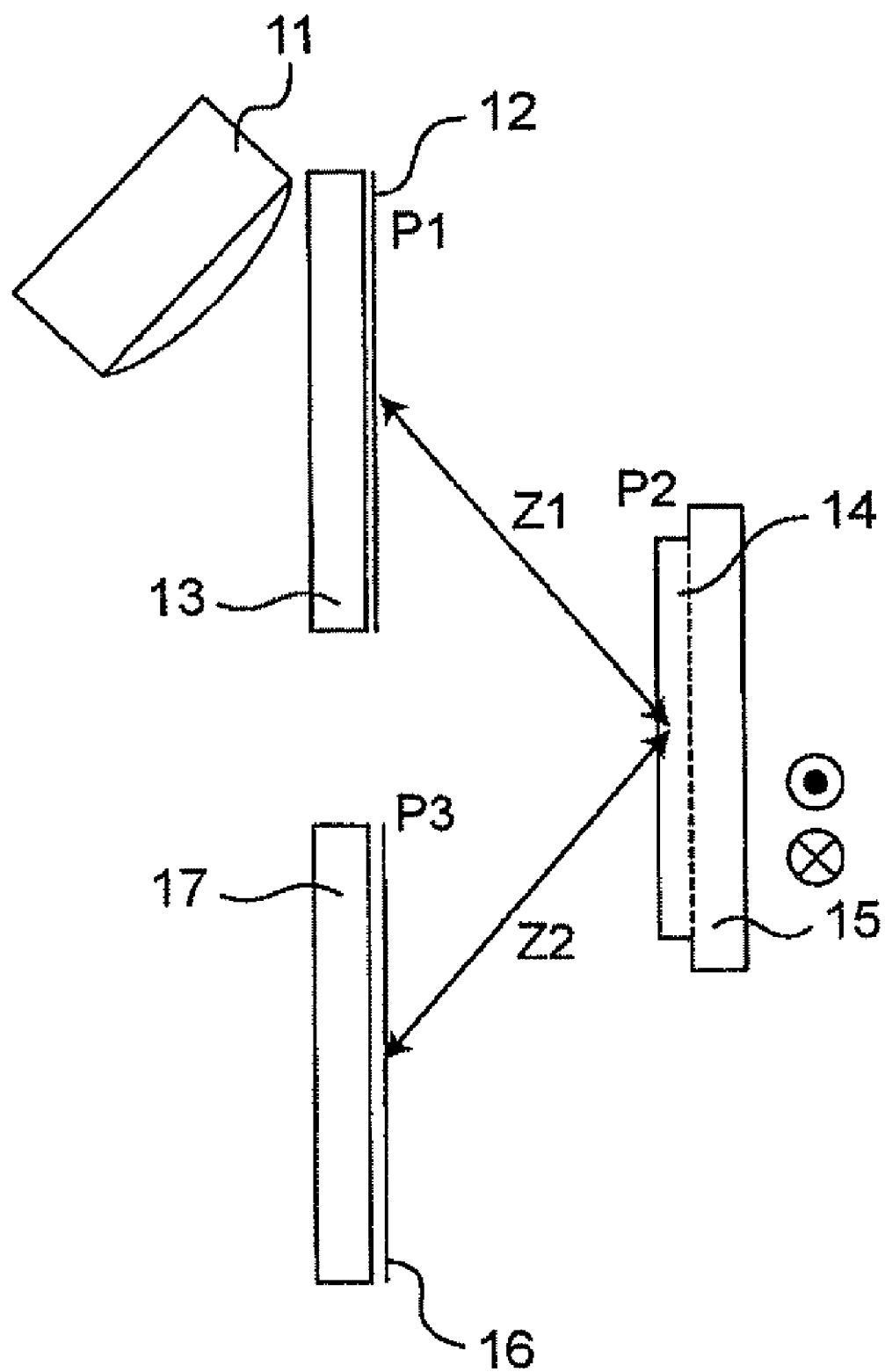
FIG. 18 is a schematic view showing Embodiment 11 according to the present invention.

FIG. 18 is a schematic view showing Embodiment 11 according to the present invention. This embodiment employs a reflective phase grating for the second grating 14. like the above embodiment. But the slit direction of each of the gratings 12, 14 and 16 is designed as a top-to-bottom direction, parallel to the sheet of the drawing, and the moving direction of the second grating 14 is designed perpendicular to the sheet of the drawing. The light from the light source 11 passes obliquely through the first grating 12, and then reflects obliquely on the second grating 14, and then passes obliquely through the third grating 16, and then reaches the light receiving element 17. Each of Z1 and Z2 is defined as a distance along the light propagating direction. The above-described theory of grating image (triplet grating method) also can apply to this configuration. In addition, a set of the light source 11 and the first grating 12 and another set of the third grating 16 and the light receiving element 17 can be arranged on the same side with respect to the second grating 14, thereby attaining a compact configuration as a whole.

In each embodiment described above, a case of the first grating 12 and the third grating 16 being fixed and the second grating 14 being movable is exemplified, but the second grating 14 may be fixed and the first grating 12 and the third grating 16 may be movable. Further, a system of the second grating 14 and the third grating 16 being moved relatively to the first grating 12 and another system of the first grating 12 and the second grating 14 being moved relatively to the third grating 16 can also obtain a signal.

In each embodiment described above, a case of the first grating 12 being composed of a grating whose transmittance varies rectangularly or sinusoidally is exemplified, but the distribution of transmittance of the first grating 12 can be designed appropriately so as to realize a desired distribution of intensity (distribution of spatial frequency) on a subsequent imaging plane.

In each embodiment described above, a case of the third grating 16 having a duty ratio of 50% is exemplified, but it may be other than 50%, and the distribution of transmittance of the third grating 16 can be designed appropriately so as to obtain a desired output.

In each embodiment described above, a case of the third grating 16 being composed of light shielding slits is exemplified, but a plurality of light receiving elements, which correspond to a opening shape of the third grating 16, may be arranged discretely with the grating period P3 to sum outputs from the light receiving elements, thereby enabling integration of the third grating 16 and the light receiving element 17 to simplify assembling operation and reduce the number of parts.

In each embodiment described above, anti-reflection coating may be applied onto each of light passing planes of the gratings 12, 14 and 16 to reduce loss of light. In this case, thickness of each coating is considered for optical design, in particular, difference in phase.

In each embodiment described above, a case of light from the light source directly entering the first grating 12 is exemplified, but a light diffusing plate having a predetermined diffusion angle may be interposed between the light source 11 and the first grating 12 so that diffused light can enter the first grating 12. In this case, adjustment of the diffusion angle of the light diffusing plate can reduce amount of light deviating out of the detecting area of the light receiving element 17, thereby improving efficiency of utilizing light.

INDUSTRIAL APPLICABILITY

According to the present invention, OTF from the light source to the light receiving element can be enhanced and efficiency of utilizing light can be greatly improved, resulting in an optical encoder with high performance and a compact size.

The invention claimed is:
1. An optical encoder comprising:
an incoherent light source;
a first grating, which is an amplitude grating having a first grating period, for spatial amplitude modulation of the incoherent light from the light source;
a second grating, which is a phase grating having a second grating period, for spatial phase modulation of light from the first grating;
a third grating, which is an amplitude grating having a third grating period, for spatial amplitude modulation of light from the second grating; and
a light detecting element for detecting light from the third grating, wherein
the encoder detects relative displacement between respective gratings,
the second grating is a reflective phase grating, and the first and third gratings are arranged on the same side of the second grating, and
the second grating has, in cross-section, ridges and valleys, a duty ratio of substantially 50%, and an optical path difference for light incident at a ridge and light incident at a valley is substantially equal to $\lambda/4$, where $\lambda$ is wavelength of light.

2. The optical encoder according to claim 1, wherein the second grating is a phase grating which has, in cross-section, ridges and valleys continuously varying in a sinusoidal shape so that the optical path length of incident light varies sinusoidally with position along the second grating.

3. The optical encoder according to claim 1, wherein the first, second, and third gratings have rotary scales.

4. The optical encoder according to claim 1, wherein the first grating has a spatial distribution of light transmittance that varies sinusoidally with position along the first grating.

5. The optical encoder according to claim 1, including a plurality of light detecting elements, wherein the light detecting elements are arranged discretely opposite respective light transmitting portions of the third grating, and the third grating and the light detecting elements are integrated with each other.

6. An optical encoder comprising:
an incoherent light source;
a first grating, which is an amplitude grating having a first grating period, for spatial amplitude modulation of the incoherent light from the light source;
a second grating, which is a phase grating having a second grating period, for spatial phase modulation of light from the first grating;
a third grating, which is an amplitude grating having a third grating period, for spatial amplitude modulation of light from the second grating; and
a light detecting element for detecting light from the third grating, wherein
the encoder detects relative displacement between respective gratings,
the second grating is a reflective phase grating, and the first and third gratings are arranged on the same side of the second grating, and
the second grating has, in cross-section, ridges and valleys, a duty ratio of substantially 50%, and an optical path difference for light incident at a ridge and light incident at a valley is substantially equal to $\lambda/8$, where $\lambda$ is wavelength of light.

7. The optical encoder according to claim 6, wherein the second grating is a phase grating which has, in cross-section, ridges and valleys continuously varying in a sinusoidal shape so that the optical path length of incident light varies sinusoidally with position along the second grating.

8. The optical encoder according to claim 6, wherein the first, second, and third gratings have rotary scales.

9. The optical encoder according to claim 6, wherein the first grating has a spatial distribution of light transmittance that varies sinusoidally with position along the first grating.

10. The optical encoder according to claim 6, including a plurality of light detecting elements, wherein the light detecting elements are arranged discretely opposite respective light transmitting portions of the third grating, and the third grating and the light detecting elements are integrated with each other.

11. An optical encoder comprising:
an incoherent light source;
a first grating, which is an amplitude grating having a first grating period, for spatial amplitude modulation of the incoherent light from the light source;
a second grating, which is a phase grating having a second grating period, for spatial phase modulation of light from the first grating;
a third grating, which is an amplitude grating having a third grating period, for spatial amplitude modulation of light from the second grating; and
a light detecting element for detecting light from the third grating, wherein
the encoder detects relative displacement between respective gratings,
the second grating has a period P,
the first and third gratings have a period 2P, and
both a first distance between the first and second gratings and a second distance between the second and third gratings are substantially odd integer multiples of $P^2/(4\lambda)$ where $\lambda$ is wavelength of light.

12. The optical encoder according to claim 11, wherein the second grating is a reflective phase grating, and the first and third gratings are arranged on the same side of the second grating.

13. The optical encoder according to claim 11, wherein the second grating is a phase grating which has, in cross-section, ridges and valleys continuously varying in a sinusoidal shape so that the optical path length of incident light varies sinusoidally with position along the second grating.

14. The optical encoder according to claim 11, wherein the first, second, and third gratings have rotary scales.

15. The optical encoder according to claim 11, wherein the first grating has a spatial distribution of light transmittance that varies sinusoidally with position along the first grating.

16. The optical encoder according to claim 11, including a plurality of light detecting elements, wherein the light detecting elements are arranged discretely opposite respective light transmitting portions of the third grating, and the third grating and the light detecting elements are integrated with each other.

17. An optical encoder comprising:
an incoherent light source;
a first grating, which is an amplitude grating having a first grating period, for spatial amplitude modulation of the incoherent light from the light source;
a second grating, which is a phase grating having a second grating period, for spatial phase modulation of light from the first grating;
a third grating, which is an amplitude grating having a third grating period, for spatial amplitude modulation of light from the second grating; and
a light detecting element for detecting light from the third grating, wherein
the encoder detects relative displacement between respective gratings,
a first distance between the first and second gratings is different from a second distance between the second and third gratings, and
the ratio of the first distance to the second distance is substantially equal to the ratio of the first grating period of the first grating to the third grating period of the third grating.

18. The optical encoder according to claim 17, wherein the second grating is a reflective phase grating, and the first and third gratings are arranged on the same side of the second grating.

19. The optical encoder according to claim 17, wherein the second grating is a phase grating which has, in cross-section, ridges and valleys continuously varying in a sinusoidal shape so that the optical path length of incident light varies sinusoidally with position along the second grating.

20. The optical encoder according to claim 17, wherein the first, second, and third gratings have rotary scales.

21. The optical encoder according to claim 17, wherein the first grating has a spatial distribution of light transmittance that varies sinusoidally with position along the first grating.

22. The optical encoder according to claim 17, including a plurality of light detecting elements, wherein the light detecting elements are arranged discretely opposite respective light transmitting portions of the third grating, and the third grating and the light detecting elements are integrated with each other.

* * * * *